(12) United States Patent
Kuwabara et al.

(10) Patent No.: US 10,558,600 B2
(45) Date of Patent: Feb. 11, 2020

(54) SEMICONDUCTOR DEVICE AND TRACE DATA STORING METHOD

(71) Applicant: Renesas Electronics Corporation, Tokyo (JP)

(72) Inventors: Keiichi Kuwabara, Tokyo (JP); Takuya Mitsuhashi, Tokyo (JP)

(73) Assignee: RENESAS ELECTRONICS CORPORATION, Tokyo (JP)

(*) Notice: Subject to any disclaimer, the term of this patent is extended or adjusted under 35 U.S.C. 154(b) by 73 days.

(21) Appl. No.: 15/984,501

(22) Filed: May 21, 2018

(65) Prior Publication Data

US 2018/0373656 A1  Dec. 27, 2018

(30) Foreign Application Priority Data

Jun. 23, 2017 (JP) ................. 2017-123242

(51) Int. Cl.
*G06F 13/28* (2006.01)
*G06F 13/16* (2006.01)
*G06F 3/06* (2006.01)

(52) U.S. Cl.
CPC ............ *G06F 13/28* (2013.01); *G06F 3/0604* (2013.01); *G06F 3/0656* (2013.01); *G06F 3/0659* (2013.01); *G06F 3/0673* (2013.01); *G06F 13/1668* (2013.01)

(58) Field of Classification Search
None
See application file for complete search history.

(56) References Cited

U.S. PATENT DOCUMENTS 7,143,205 B2   11/2006  Sakugawa

FOREIGN PATENT DOCUMENTS

JP         2003-6003 A     1/2003

*Primary Examiner* — Scott C Sun
(74) *Attorney, Agent, or Firm* — McDermott Will & Emery LLP (57) ABSTRACT

The present invention enables an unaligned access of a DMA controller to be dealt at the time of obtaining trace data. A DMA controller receives a DMA request and accesses a memory via a bus on a predetermined access unit basis in accordance with the received DMA request. When the DMA request indicates "read", a trace interface outputs the data obtained from the memory by the DMA controller, a start address designated by the DMA request, and valid transfer size in the data obtained from the memory to a trace circuit. The trace circuit stores data of the amount of the valid transfer size from the start address designated by the DMA request in the data obtained from the memory into the trace buffer.

15 Claims, 6 Drawing Sheets

SEMICONDUCTOR DEVICE AND TRACE DATA STORING METHOD

CROSS-REFERENCE TO RELATED APPLICATIONS

The disclosure of Japanese Patent Application No. 2017-123242 filed on Jun. 23, 2017 including the specification, drawings and abstract is incorporated herein by reference in its entirety.

BACKGROUND

The present invention relates to a semiconductor device and a trace data storing method and relates to, for example, a semiconductor device having a DMA (Direct Memory Access) controller and a trace data storing method in such a semiconductor device.

Japanese Unexamined Patent Application Publication No. 2003-6003 (patent literature 1) discloses a semiconductor integrated circuit having a function module such as a CPU (Central Processing Unit) and a DMA controller. In the patent literature 1, it is written that, in such a semiconductor integrated circuit, to assist debugging of a program and a system, an address and data which is transferred via a bus to which the function module and the DMA controller are coupled is traced.

Concretely, in the patent literature 1, the DMA controller receives a DMA request via a plurality of channels. The DMA controller has arbitration means, and the arbitration means selects one of a plurality of DMA requests received via the plurality of channels in accordance with priorities assigned to the plurality of channels in advance. In the patent literature 1, trace data regarding the DMA request selected by the arbitration means is stored in a trace buffer.

SUMMARY

There is a case that the DMA controller accesses the memory on a predetermined access unit basis. On the other hand, there is a case that the range of transfer data designated by a DMA request received by the DMA controller is not limited to the predetermined access unit, and the range of the transfer data designated by the DMA request does not match the predetermined access unit. In the case of an unaligned access to the memory, the DMA controller accesses the memory on the predetermined access unit basis, extracts necessary data from the data obtained from the memory, and transfers it to a device in a transfer destination.

However, in the semiconductor integrated circuit described in the patent literature 1, an unaligned access is not considered at the time of storing trace data. In the patent literature 1, data transferred via a bus is stored in a trace buffer. Consequently, when an unaligned access occurs, not only data actually DMA transferred but also data of addresses in the periphery is stored into the trace buffer.

The other objects and novel features will become apparent from the description of the specification and appended drawings.

According to an embodiment, a semiconductor device has a DMA controller accessing a memory in a predetermined access unit and a trace interface. When a DMA request indicates "read", the trace interface outputs data obtained from a memory by the DMA controller, a start address designated by the DMA request, and valid transfer size in the data obtained from the memory to a trace circuit. The trace circuit stores data of the amount of the valid transfer size from the start address designated by the DMA request in the data obtained from the memory into the trace buffer.

According to the embodiment, also in the case where data to be DMA transferred becomes unaligned with a unit of an access to a memory, storage of unnecessary data to the trace buffer can be suppressed.

DETAILED DESCRIPTION

Hereinafter, embodiments to which means for solving the problem is applied will be described in detail with reference to the drawings. To make description clear, the following description and drawings are properly omitted and simplified. Elements illustrated in the drawings as function blocks performing various processes can be configured by a CPU (Central Processing Unit), a memory, and other circuits as hardware and realized by a program loaded to a memory or the like as software. Therefore, a person skilled in the art understands that those function blocks can be realized in various forms by only hardware, only software, or combination of hardware and software and are not limited to any of them. In the drawings, the same reference numeral is assigned to the same components and repetitive description is omitted as necessary.

The above-described program is stored by using non-transitory computer readable media. of various types and can be supplied to a computer. The non-transitory computer readable media include tangible storage media of various types. Examples of the non-transitory computer readable media include magnetic recording media (for example, flexible disk, magnetic tape, and hard disk), magnet-optic recording media (for example, magnet-optic disk), CD-ROM (Read Only Memory), CD-R, CD-R/W, and semiconductor memories (for example, mask ROM, PROM (Programmable ROM), EPROM (Erasable PROM), flash ROM, and RAM (Random Access Memory)). The program may be supplied to by any of transitory computer readable media of various types. Examples of the transitory computer readable media include an electric signal, an optical signal, and an electromagnetic wave. The transitory computer readable medium can supply a program to a computer via a wired communication path such as an electric wire or an optical fiber or a wireless communication path.

In the following embodiments, when it is necessary for convenience, an embodiment will be described by being divided into a plurality of sections or embodiments. Unless otherwise clearly specified, they are not non-related to one another but have relations such as modification, application, detailed description, and supplementary explanation in which one is a part or all of the other. In the following embodiments, in the case of referring to the number of elements and the like (including the number of pieces, numerical value, quantity, and range), except for the case where it is clearly mentioned, the case where the invention is principally clearly limited to a specific value, and the like, the invention is not limited to the specific value. The number may be larger or smaller than the specific value.

Further, in the following embodiments, obviously, components (including operation steps) are not always necessary except for the case where it is clearly mentioned, the case where it is considered that a component is principally clearly necessary, and the like. Similarly, in the following embodiments, when shape, position relation, and the like of components are mentioned, they substantially include shape and the like close or similar to them except for the case where it is clearly mentioned, the case where it is considered that the shape and the like are not principally clearly similar, and the like. This is similarly applied also to the number and the like (including the number of pieces, numerical value, quantity, and range).

First Embodiment

Figure 1:
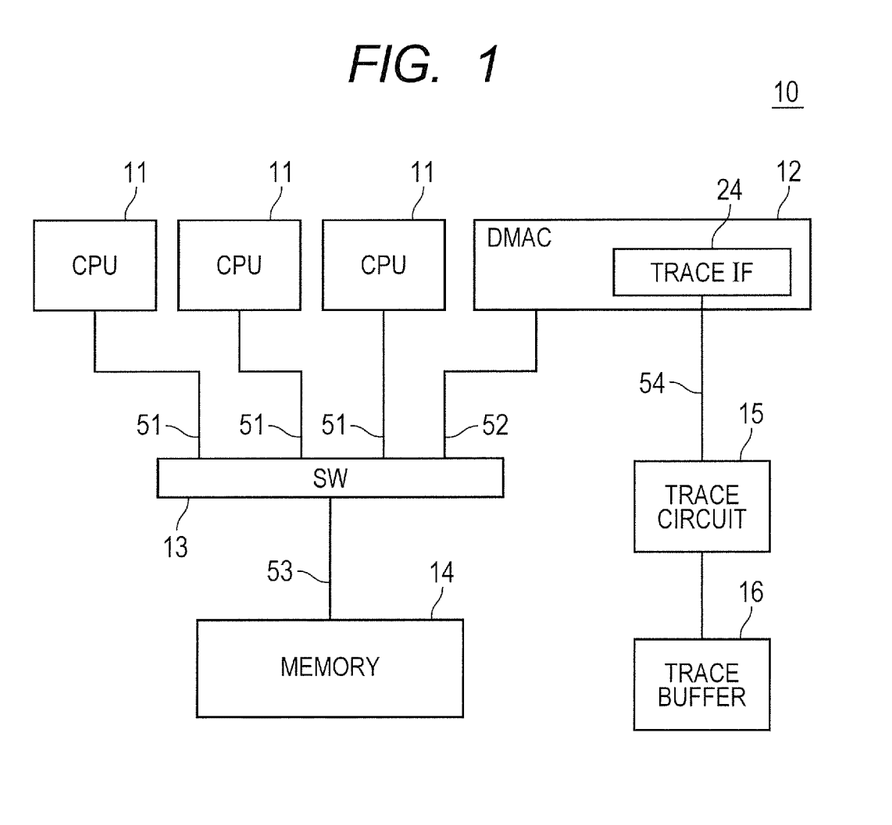
FIG. 1 is a block diagram illustrating a semiconductor device according to a first embodiment.

FIG. 1 illustrates a semiconductor device according to a first embodiment. A semiconductor device 10 has a plurality of CPUs 11, a DMA controller 12, a switch 13, a memory 14, a trace circuit 15, and a trace buffer 16. FIG. 1 illustrates an example that the semiconductor device 10 has three CPUs 11. However, the number of CPUs 11 is not limited. For example, it is sufficient that the semiconductor device 10 has at least one CPU 11. Although not illustrated in FIG. 1, the semiconductor device 10 may have other peripheral devices and the like.

The CPUs 11 and the DMA controller 12 are coupled to the memory 14 via the switch 13. Each of the CPUs 11 and the switch 13 are coupled via a bus 51, and the DMA controller 12 and the switch 13 are coupled via a bus 52. The switch 13 and the memory 14 are coupled via a bus 53. The switch 13 is, for example, a crossbar switch which couples one of the bus 51 coupled to each of the CPUs 11 and the bus 52 coupled to the DMA controller 12, and the bus 53 coupled to the memory 14. The buses 51 to 53 are, for example, AXI (Advanced eXtensible Interface) buses for performing communication in accordance with the AXI bus protocol.

The DMA controller 12 receives a DMA request and accesses the memory 14 in accordance with the received DMA request. The DMA request includes, for example, information indicating the kind of an access of read or write, information regarding the address (start address), information regarding a transfer destination or a transfer source, and information such as transfer data size. The DMA controller 12, for example, reads data from the memory via the bus 52 and transfers the read data to a transfer destination such as a not-illustrated peripheral device. Alternately, the DMA controller 12 obtains data from a transfer source and writes the obtained data to the memory 14 via the bus 52.

In the embodiment, the DMA controller 12 accesses the memory 14 via the bus 52 on a predetermined access unit basis. For example, the bus 52 includes a data bus having a predetermined data width, and the DMA controller 12 accesses the memory 14 on the predetermined data width unit basis to an address which is exactly divisible by the predetermined data width. Concretely, for example, in the case of reading data from the memory 14, the DMA controller 12 uses an address which is exactly divisible by eight bytes as a read start address and reads data from the address on the 8-byte unit basis.

The DMA controller 12 includes a trace interface 24. The trace interface 24 outputs information regarding an access to the memory 14 via the bus 52 by the DMA controller 12 to the trace circuit 15 via the bus 53. As the bus 53, for example, an AXI bus or a bus obtained by extending the AXI bus can be used. The trace circuit 15 collects trace data and stores it into the trace buffer 16. The trace buffer 16 is a storage device for storing trace data. For example, the trace circuit 15 generates trace data on the basis of information output from the trace interface 24 and stores it into the trace buffer 16. It is not always necessary to provide the trace interface 24 on the inside of the DMA controller 12. The trace interface 24 may be provided on the outside of the DMA controller 12.

DMA Controller

Figure 2:
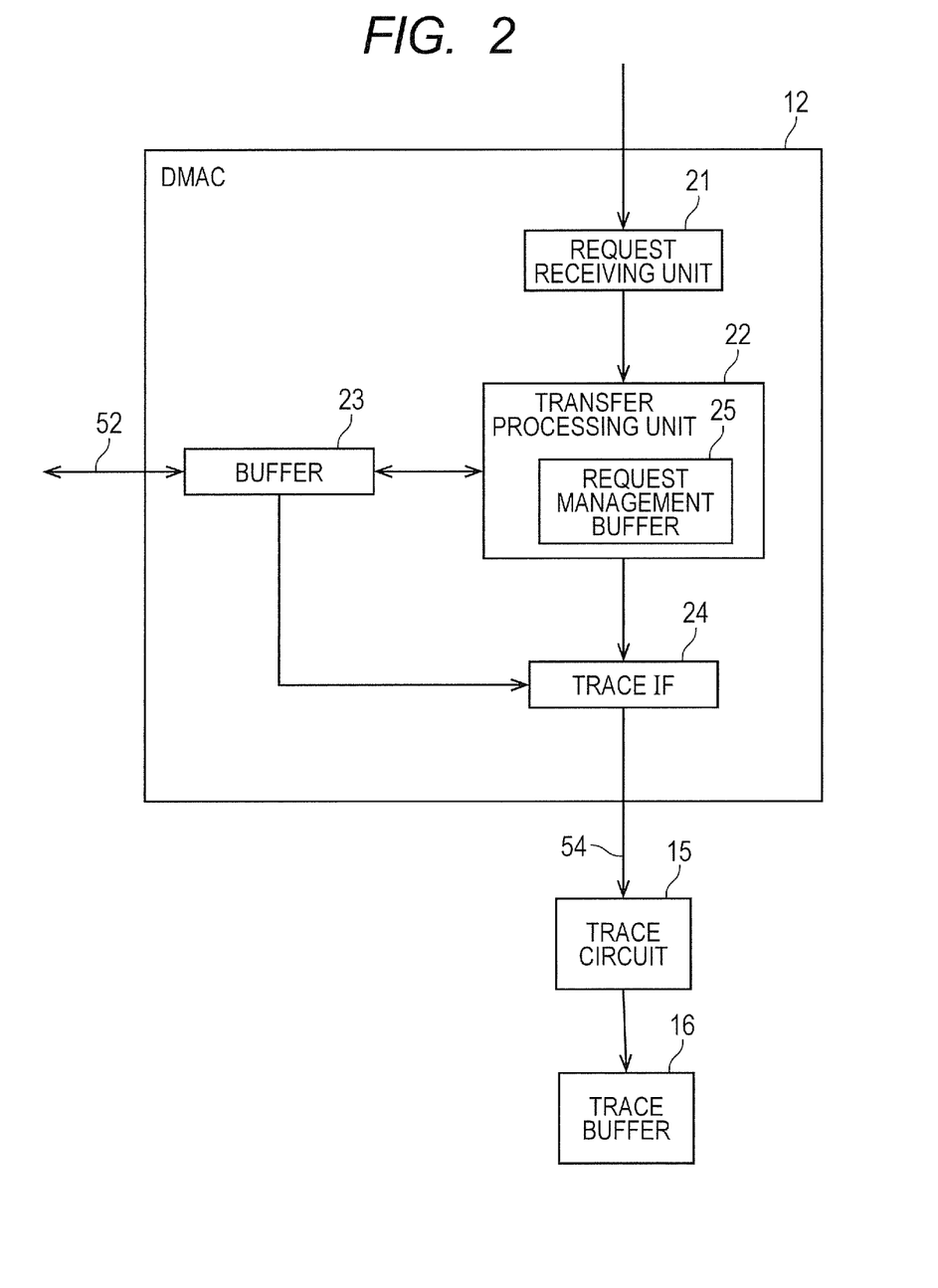
FIG. 2 is a block diagram illustrating the configuration of a DMA controller.

FIG. 2 illustrates the configuration of the DMA controller 12. The DMA controller 12 has a request receiving unit 21, a transfer processing unit 22, a buffer 23, and the trace interface 24. The request receiving unit 21 receives a DMA request from another device, for example, from the CPU 11. The DMA request includes "read" of reading data from the memory 14 and "write" of writing data to the memory 14. The request receiving unit 21 includes, for example, a register. By writing a DMA request to the register by the CPU 11 (refer to FIG. 1) or the like, the DMA request is received. The request receiving unit 21 has, for example, a plurality of channels and is configured that a plurality of DMA requests can be received.

The transfer processing unit 22 accesses the memory 14 in accordance with the DMA request received by the request receiving unit 21. When the DMA request indicates "read", the transfer processing unit 22 transmits a read request to the memory 14 via the bus 52. The memory 14 receives the read request and, in response to it, transmits (returns) read data to the transfer processing unit 22 via the bus 52. The transfer processing unit 22 transfers the read data obtained from the memory 14 to a transfer destination designated by the DMA request. When the DMA request indicates "write", the transfer processing unit 22 obtains write data from a transfer source designated in the DMA request and transmits a write request and write data to the memory 14 via the bus 52. When the write request is received, the memory 14 stores the write data.

The bus 52 includes, for example, a read address channel, a read data channel, a write address channel, and a write data channel. When the DMA request indicates "read", the transfer processing unit 22 transmits a read request including a read start address (ARADDR) to the memory 14 via the read address channel of the bus 52. The read request may further include burst size (ARSIZE) and burst length (ARLEN). The transfer processing unit 22 obtains the read data (RDATA) from the memory 14 via the read data channel of the bus 52.

On the other hand, when the DMA request indicates "write", the transfer processing unit 22 transmits a write request including the write start address (AWADDR) to the memory 14 via the write address channel of the bus 52. The write request may further include burst size (AWSIZE) and burst length (AWLEN). The transfer processing unit 22 transmits write data (WDATA) and a strobe signal (WSTRB) for designating data to be written in data output to the write data channel (data bus for writing) via the write data channel of the bus 52. The data width of the data bus of the read data channel and the write data channel corresponds to, for example, the predetermined access unit when the DMA controller 12 accesses the memory 14.

The transfer processing unit 22 may include a request management buffer 25. The request management buffer 25 manages the corresponding relation between the DMA request and the read request output to the memory 14. The request management buffer 25 stores, for example, the ID (Identifier) of a DMA request, a channel which receives the DMA request, the ID of a read request, and a read start address included in the read request so as be associated with one another. The request management buffer 25 also stores the ID of the DMA request, the lower-order address (address offset) corresponding to the difference between the start address designated by the DMA transfer and the read start address, and the data size of data which is DMA transferred so as to be associated with one another. The transfer processing unit 22 executes the DMA transfer process with reference to the request management buffer 25.

The buffer 23 stores a signal output from the DMA controller 12 to the bus 52 and a signal received by the DMA controller 12 from the bus 52. The buffer 23 temporarily stores, for example, signals of the above-described channels. More specifically, the buffer 23 temporarily stores a read request transmitted to the memory 14 via the read address channel and temporarily stores read data which is transmitted to the DMA controller 12 via the read data channel. The buffer 23 temporarily stores a write request transmitted to the memory 14 via the write address channel and temporarily stores write data and a strobe signal transmitted to the memory 14 via the write data channel. The trace interface 24 generates a signal which is output to the trace circuit 15 via the bus 53 on the basis of the signal stored in the buffer 23.

The memory access on the predetermined access unit basis will now be described. At the time of transferring data, the DMA controller 12 performs operation of reading also data which is not actually transferred and transferring (writing) only necessary data as an access method of higher bus efficiency. The DMA controller 12 realizes such operation by burst transfer. In the AXI protocol, in the case of the burst transfer, the read start address (ARADDR) designated by the read request has to be designated by an address aligned to the data size (ARSIZE) per cell. However, there is a case that the DMA controller 12 transfers data in an address range which is unaligned (misaligned) to the data size per cell.

Figure 3:
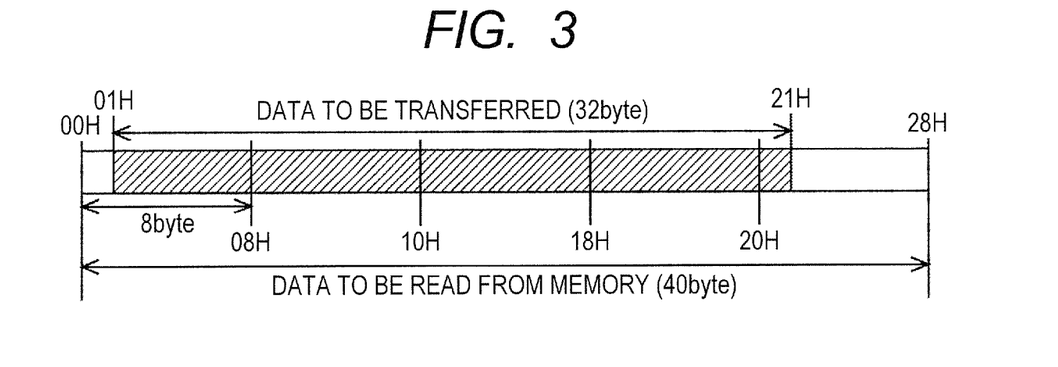
FIG. 3 is a diagram schematically illustrating a memory access by the DMA controller.

FIG. 3 schematically illustrates a memory access by the DMA controller 12. A case that the data size per cell is eight bytes and the DMA controller 12 accesses the memory 14 on the 8-byte unit basis will be examined. A case that the DMA controller 12 receives a DMA request of, using the address 01H as a start address, reading of data of 32 bytes from the start address, and transferring the read data to a transfer destination will be examined.

In the case of reading data from the memory 14, the DMA controller 12 accesses the memory 14, for example, using addresses (boundary addresses) exactly divisible by eight bytes such as addresses 00H, 08H, 10H, 18H, and 20H as read start addresses. When the start address designated by the DMA request and the access unit to the memory 14 do not match, and/or when the size of data which is DMA transferred is less than the predetermined access unit, an access of the DMA controller 12 to the memory 14 becomes an unaligned access.

In the case where the DMA request indicates "read", the DMA controller 12 (transfer processing unit 22) determines whether the start address designated by the DMA request matches the boundary address on the predetermined access unit or not. When it is determined that they do not match, the DMA controller 12 outputs the read request including the address aligned to the boundary address as a read start address to the memory 14 via the bus 52. For example, when the start address designated by the DMA request is 01H and the size of data which is DMA transferred is 32 bytes, the DMA controller 12 requests the memory 14 to obtain data of 40 bytes from the address 00H to 27H via the bus 52.

When the read request is received from the DMA controller 12, the memory 14 transmits data including data in the range designated by the DMA request and data out of the range to the DMA controller 12 via the bus 52. Concretely, the memory 14 transmits data of 40 bytes from address 00H to 27H to the DMA controller 12 via the bus 52. The DMA controller 12 extracts data of 32 bytes using, as the head address, the address 01H designated by the DMA request from the data of 40 bytes obtained from the memory 14, and transfers it to a transfer destination designated by the DMA transfer.

In the above example, the DMA controller 12 obtains data of 40 bytes including not only data of 32 bytes which is actually DMA transferred but also data of the address of periphery from the memory 14. At this time, when the trace circuit 15 simply stores data output from the memory 14 to the DMA controller 12 via the bus 52 as trace data into the trace buffer 16, extra data which is not actually transferred is also stored in the trace buffer 16. In this case, for example, when a break point or the like is set in the address of the data which is not actually transferred, there is the possibility that an event of temporarily stopping the operation of the CPU 11 or the like and notifying an external debug tool occurs and that intended debugging is not executed. The embodiment provides means for mainly solving such a problem.

Referring again to FIG. 2, in the case where the DMA request indicates "read" in the embodiment, to solve the problem, the trace interface 24 outputs the data obtained from the memory 14, the start address designated by the DMA request, and the valid transfer size in the data obtained from the memory 14 to the trace circuit 15 via the bus 54. The valid transfer data size refers to the data size of data in the range designated by the DMA request. In other words, the valid transfer data size refers to the size of data to be DMA transferred in the data obtained from the memory 14.

In the case of an unaligned access, the trace interface 24 rewrites the read start address of the memory 14 included in the read request buffered in the buffer 23 to the start address designated by the DMA request, and outputs the read request in which the read start address is rewritten and the read data buffered in the buffer 23 to the trace circuit 15. At this time, the trace interface 24 may add valid transfer size which does not exist on the read address channel of the bus 52 to the read request and outputs the resultant to the trace circuit 15.

For example, when the DMA controller 12 outputs a read request, the trace interface 24 rewrites the read start address included in the read request obtained from the buffer 23 to the start address designated by the DMA request with reference to the request management buffer 25. More specifically, for example, the trace interface 24 reads an offset address (lower-order address) corresponding to the read request from the request management buffer 25 and, by adding the read offset address to the read start address included in the read request, rewrites the read start address included in the read request to the start address designated by the DMA request. When the access is not an unaligned access, the read start address and the start address designated by the DMA request match and the offset address is zero. Consequently, even if the offset address is added to the read start address included in the read request, the read start address does not change. The trace interface 24 obtains the valid transfer size from the request management buffer 25, adds the obtained valid transfer size to the read request, and outputs the resultant to the trace circuit 15.

The trace circuit 15 stores data of the amount of the valid transfer size from the start address designated by the DMA request in the data obtained from the memory 14 into the trace buffer 16. For example, in the example of FIG. 3, the trace circuit 15 stores data of the amount of 32 bytes of the valid transfer size from the address 01H in the data of the 40 bytes obtained from the memory 14 together with other accompanying information into the trace buffer 16. In such a manner, even in the case of an unaligned access, only the data to be DMA transferred in the data obtained from the memory 14 can be stored into the trace buffer 16.

On the other hand, when the DMA request indicates "write", the trace interface 24 outputs the data designated as data to be written by the strobe signal in the data output to the memory 14, the start address designated by the DMA request, and the valid transfer size in the data output to the write data channel to the trace circuit 15. For example, the trace interface 24 obtains data output from the buffer 23 to the write data channel and shifts the data designated as data to be written by the strobe signal in the obtained data to the most significant bit or least significant bit side. The trace interface 24 outputs the data whose bit position is shifted and the write request obtained from the buffer 23 to the trace circuit 15. At this time, the trace interface 24 may add the valid transfer size to the write request and output the resultant to the trace circuit 15.

The trace circuit 15 stores the data output from the trace interface 24 into the trace buffer 16. The trace circuit 15 stores, for example, data of the amount of the valid transfer size from the most significant bit or least significant bit side in the data shifted to the most significant bit side or the least significant bit side in the trace interface 24 into the trace buffer 16.

Operation Example of Reading

Figure 4:
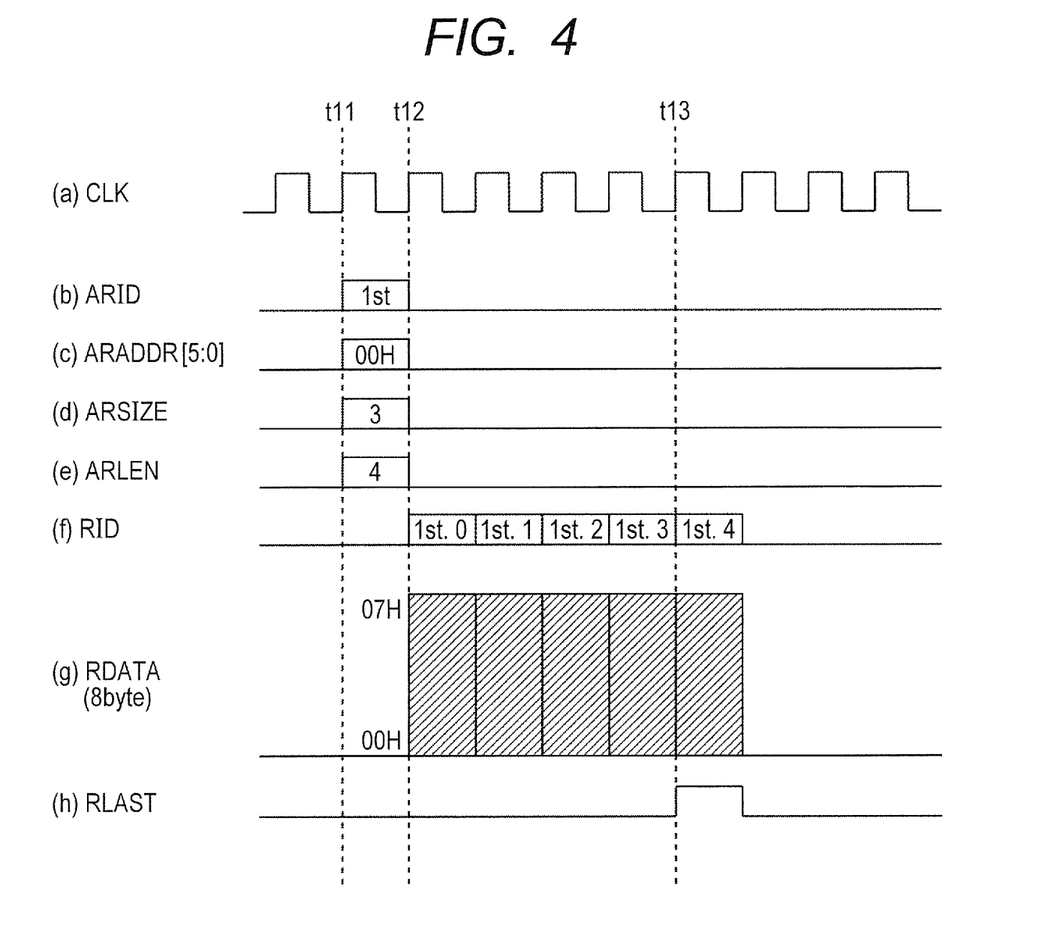
FIG. 4 is a timing chart illustrating an example of operation signals when the DMA controller reads data from a memory.

Hereinafter, an operation example will be described. FIG. 4 illustrates an example of operation signals when the DMA controller 12 reads data from the memory 14. The ID (ARID) of the read request (refer to (b)), the read start address ARADDR (refer to (c)), the burst size ARSIZE (refer to (d)), and the burst length ARLEN (refer to (e)) illustrated in FIG. 4 express signals in the read address channel of the bus 52. A read ID (RID) (refer to (f)), read data RDATA (refer to (g)), and a read last signal RLAST (refer to (h)) express signals in the read data channel of the bus 52. The bus 52 operates at timings according to the clock signal CLK (refer to ((a)).

The DMA controller 12 receives the DMA request of reading data of 32 bytes from the address 01H in the memory 14 and transferring it to a device as a transfer destination (refer also to FIG. 3). The DMA controller 12 issues a read request through a read address channel of the bus 52 at time t11. The DMA controller 12 issues a read request that ARADDR is "00H", ARSIZE is "3", and ARLEN is "4" at time t11. That is, the DMA controller 12 issues a read request that the read start address is 00H, the burst size is eight bytes, and the burst length is five times to the memory 14.

The memory 14 receives the read request, for example, starts the data reading according to the read request at time t12, and outputs the read data as a response to the read request to the DMA controller 12. Concretely, the memory 14 reads data five times each by eight bytes from the address 00H indicated by ARADDR and sequentially outputs the read data of eight bytes each time as RDATA to the DMA controller 12. As RID in the read data channel, the same ID as ARID included in the read request is used. After reading final data at time t13, the memory 14 asserts a read last signal RLAST and notifies that the data is the final data to the DMA controller 12.

Figure 5:
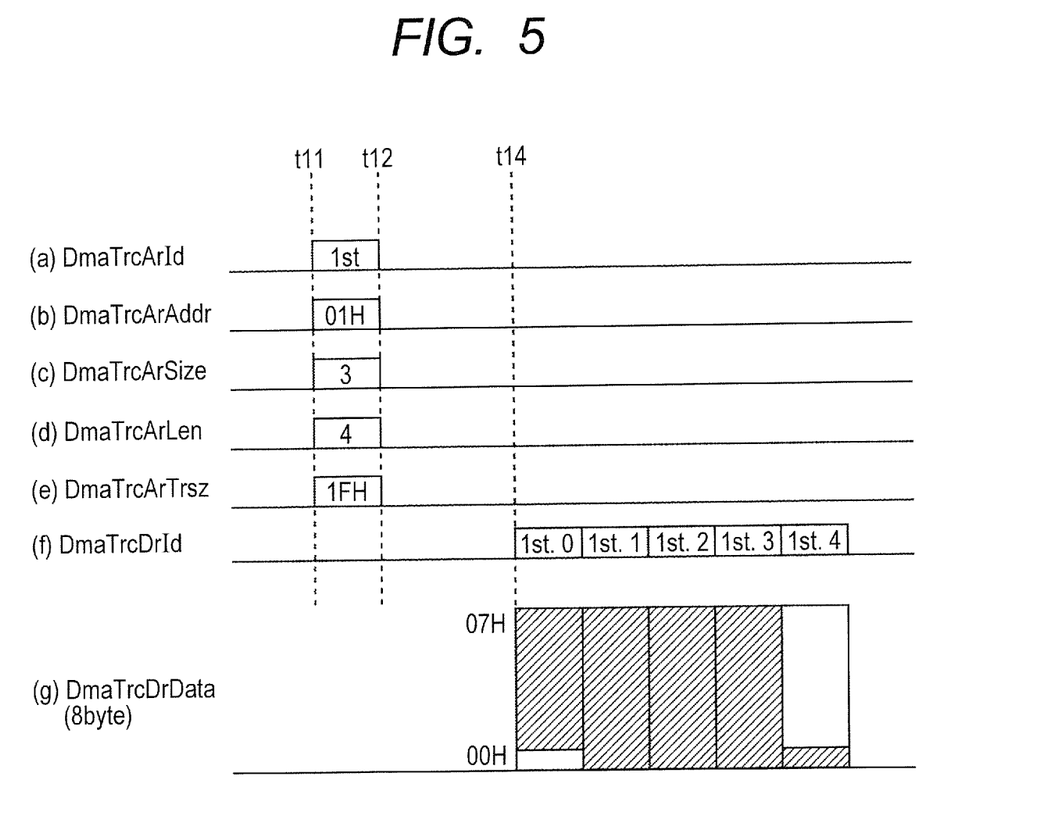
FIG. 5 is a timing chart illustrating signals output to a trace circuit when data reading is performed.

FIG. 5 illustrates signals output to the trace circuit when the data reading is performed. The trace interface 24 outputs the ID (ARID) of the read request in the bus 52 as DmaTrcArID (refer to (a)), outputs the burst size ARSIZE as DmaTrcArSize (refer to (c)), and outputs the burst length ARLEN as DmaTrcArLen (refer to (d)). The trace interface 24 also outputs the read ID (RID) on the bus 52 as DmaTrcDrID (refer to (f)) and outputs the read data RDATA as DmaTrcDrDATA (refer to (g)).

In the embodiment, the trace interface 24 outputs, in place of outputting the read start address ARADDR in the bus 52 as it is to the trace circuit 15, an address obtained by adding an offset address stored in the request management buffer 25 (refer to FIG. 2) to the read start address ARADDR as DmaTrcArAddr (refer to (b)). Concretely, the trace interface 24 outputs an address obtained by adding the offset address "01H" (also refer to FIG. 3) to ARADDR"00H" as DmaTrcArAddr.

The trace interface 24 generates the valid transfer size DmaArTrsz (refer to (e)) as a signal which does not exist in the bus 52. Concretely, the trace interface 24 obtains the data size of "32 bytes" of data which is DMA transferred from the request management buffer 25 and outputs DmaTrArTrsz "1FH" indicating that the valid transfer size is 32 bytes to the trace circuit 15. In this example, the trace circuit 15 stores data in the address range (01H to 20H) hatched in FIG. 5 in DmaTrcDrData of 40 bytes output from the trace interface 24 as valid data into the trace buffer 16.

Operation Example of Writing

Figure 6:
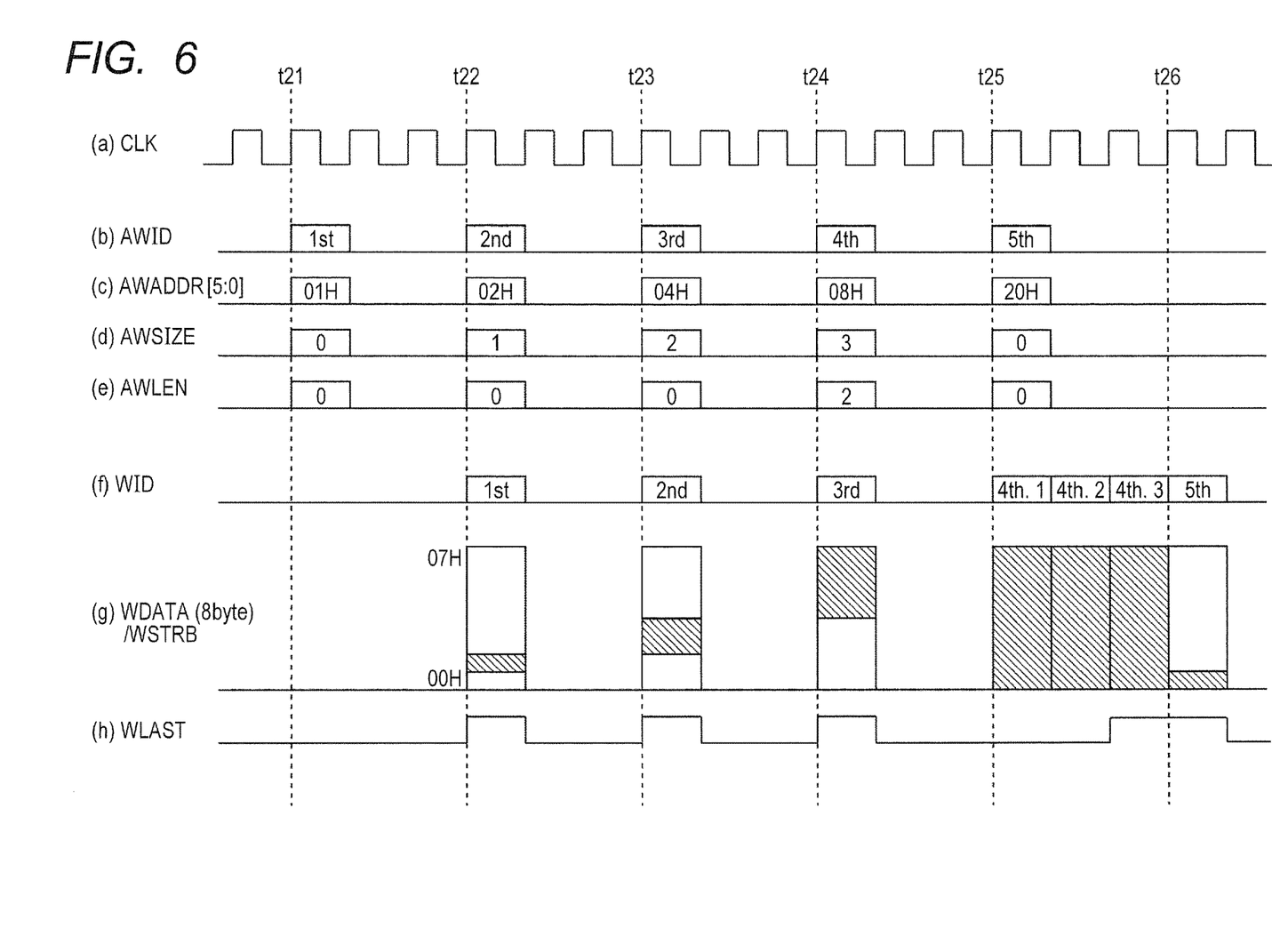
FIG. 6 is a timing chart illustrating an example of operation signals when the DMA controller writes data to the memory.

FIG. 6 illustrates an example of operation signals when the DMA controller 12 writes data to the memory 14. The ID (AWID) of the write request (refer to (b)), the write start address AWADDR (refer to (c)), the burst size AWSIZE (refer to (d)), and the burst length AWLEN (refer to (e)) illustrated in FIG. 6 express signals in the write address channel of the bus 52. A write ID (WID) (refer to (f)), read data WDATA and a strobe signal WDTRB (refer to (g)), and a write last signal WLAST (refer to (h)) express signals in the write data channel of the bus 52. In a manner similar to FIG. 4, the bus 52 operates at timings according to the clock signal CLK (refer to (a)).

The case that the DMA controller 12 receives the DMA request of obtaining data of 32 bytes from a transfer source and writing the data of 32 bytes from the address 01H in the memory 14 will be examined. When the writing is unaligned, the DMA controller 12 properly divides data and issues a plurality of write requests. The DMA controller 12 divides, for example, data of 32 bytes to five pieces of data of one byte, two bytes, four bytes, 24 bytes, and one byte and sequentially issue write requests for writing the divided data to the memory 14.

First, the DMA controller 12 issues the first write request via the write address channel of the bus 52 at time t21. At the time t21, the DMA controller 12 issues a write request that AWADDR is "01H", AWSIZE is "0", and AWLEN is "0". That is, the DMA controller 12 issues a write request that the burst size is one byte from the address 01H and the burst length is once to the memory 14. At this time, the DMA controller 12 notifies to the memory 14 that data of a part in, for example, the data bus of eight bytes is data to be written (valid data) by using the strobe signal WSTRB.

Subsequently, the DMA controller 12 issues the second write request through the write address channel of the bus 52 at time t22. At the time t22, the DMA controller 12 issues a write request that AWADDR is "02H", AWSIZE is "1", and AWLEN is "0". That is, the DMA controller 12 issues a write request that the burst size is two bytes from the address 02H and the burst length is once to the memory 14.

Subsequently, the DMA controller 12 issues the third write request through the write address channel of the bus 52 at time t23. At the time t23, the DMA controller 12 issues a write request that AWADDR is "04H", AWSIZE is "2", and AWLEN is "0". After that, similarly, the DMA controller 12 issues a write request that AWADDR is "08H", AWSIZE is "3", and AWLEN is "2" at time t24, and issues a write request that AWADDR is "20H", AWSIZE is "0", and AWLEN is "0" at time t25.

When a write request is received, according to the write request, the memory 14 writes data to the address designated by AWADDR. At time t22, the memory 14 writes data of one byte in the address 01H indicated by AWADDR in accordance with the first write request. As WID in the write data channel, the same ID as AWID included in each of the write requests is used. The memory 14 asserts the write last signal WLAST at time t22 and notifies that the written data to the DMA controller 12 is the final data of the first write request.

After that, similarly, the memory 14 writes data of two bytes from the address 02H indicated by AWADDR in accordance with the second write request at time t23, and writes data of four bytes from the address 04H indicated by AWADDR in accordance with the third write request at time t24. The memory 14 writes data of eight bytes three times in a row from the address 08H indicated by AWADDR in accordance with the fourth write request at time t25, and writes data of one byte from the address 20H indicated by AWADDR in accordance with the fifth write request at time t26.

Figure 7:
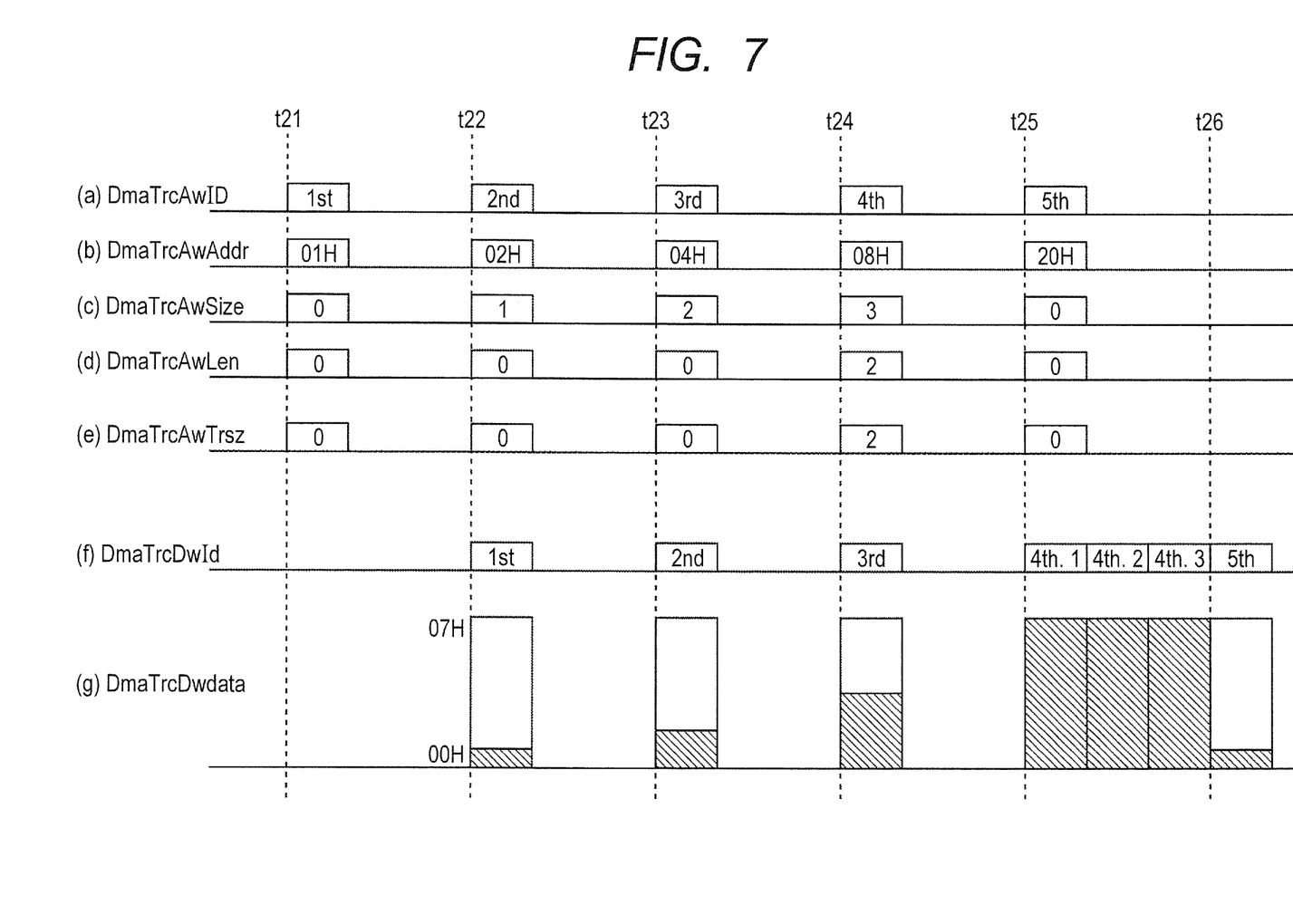
FIG. 7 is a timing chart illustrating signals output to the trace circuit when data writing is performed.

FIG. 7 illustrates signals output to the trace circuit when the data writing is performed. The trace interface 24 outputs the ID (AWID) of the write request in the bus 52 as DmaTrcAwID (refer to (a)), outputs the burst size AWSIZE as DmaTrcAwSize (refer to (c)), and outputs the burst length AWLEN as DmaTrcAwLen (refer to (d)). The trace interface 24 also outputs the write ID (WID) in the bus 52 as DmaTrcDwID (refer to (f)).

In the embodiment, the trace interface 24 outputs data obtained by shifting the write data WDATA to the least significant bit side as DmaTrcDwData (refer to (g)) to the trace circuit 15. A part in which data after the data shift does not exist is filled with, for example, "0". In a manner similar to the case of reading, the trace interface 24 generates a valid transfer size DmaAwTrsz (refer to (e)) as a signal which does not exist in the bus 52. The valid transfer size DmaAw-Trsz can be generated on the basis of the strobe signal WSTRB. In a manner similar to the case of reading, the trace circuit 15 stores data of the amount of the valid transfer size in DmaTrcDwData output from the trace interface 24 into the trace buffer 16.

Summary

In the embodiment, the trace circuit 15 obtains data and the like from the DMA controller 12 via the trace interface 24. When the DMA request received by the DMA controller 12 indicates "read", the trace interface 24 outputs data obtained from the memory by the DMA controller 12, the start address designated by the DMA request, and the valid transfer size in the data obtained from the memory to the trace circuit 15. The trace circuit 15 stores data of the amount of the valid transfer size from the start address designated by the DMA request in the data obtained from the memory into the trace buffer 16.

In some cases, the DMA controller 12 reads data in the address range which is unnecessary for the DMA transfer from the memory 14, and data passing through the bus 52 includes unnecessary data. When such unnecessary data is stored in the trace buffer 16, the unnecessary data is regarded as valid data in debugging. For example, in the case of monitoring a data access (DMA issue access) to an arbitrary address range by the DMA controller 12 in debugging, when unnecessary data is regarded as valid data, there is the possibility that an unnecessary event occurs and debugging cannot be performed normally.

In the embodiment, the trace interface 24 adds an offset address managed by the request management buffer 25 to the read start address included in the read request, and outputs the read start address to which the offset address is added to the trace circuit 15. The read start address to which the offset address is added matches the start address designated by the DMA request. The trace interface 24 adds the transfer data size (valid transfer size) managed by the request management buffer 25 to the read request output to the bus 52 and outputs the resultant to the trace circuit 15. By using the information, the trace circuit 15 can know effective data in a part of the data obtained from the memory 14. In the embodiment, by storing, for example, only the valid part in the data into the trace buffer 16 by the trace circuit 15, the case that the unnecessary data is regarded as valid data in debugging can be suppressed.

Second Embodiment

Next, a second embodiment will be described. The configuration of a semiconductor device according to the second embodiment may be similar to that of the semiconductor device 10 according to the first embodiment illustrated in FIG. 1. In the embodiment, the DMA controller 12 performs management by assigning a trace identifier to each of a plurality of read requests and write requests. The trace interface 24 further outputs the trace identifier to the trace circuit 15. The other points may be similar to those of the first embodiment.

In the second embodiment, it is assumed that the DMA controller 12 can issue, for example, up to 16 read requests. For example, each time a read request is issued, the transfer processing unit 22 (refer to FIG. 2) adds the ID (ARID) of the read request, the read start address (ARADDR), the offset address, and the like to the request management buffer 25. When all of responses to the requests are obtained from the memory 14, the transfer processing unit 22 deletes the entry of the corresponding read request from the request management buffer 25.

In the embodiment, for example, ARID is extended, an ID obtained by adding an addition ID for tracing to ARID is used as a trace identifier (trace ID). More specifically, for example, the ID of total eight bits obtained by adding the addition ID of four bits to ARID of four bits is used as the trace ID. The addition ID is used for identifying a plurality of read requests having the same ARID. On the write side as well, an ID obtained by adding an addition ID of four bits to AWID is used as the trace ID.

In this case, when a plurality of read requests are received, (the controller of) the memory 14 outputs read data in order from a request to which a response becomes ready, not in order of reception of the requests. For example, the case where two read requests having an ARID (ARID1) are issued and, subsequently, a read request having another ARID (ARID2) is issued will be examined. There is a case that a response to the read request of ARID2 is output from the memory 14 prior to a response to the read request of ARID1.

In this case, in the embodiment, when the first read request of ARID1 is output to the trace circuit 15, the trace interface 24 outputs the trace ID (ARID1+0001b) to the trace circuit 15 in place of ARID. The trace interface 24 outputs the trace ID (ARID1+0010b) to the second read request of ARID1 to the trace circuit 15. The trace interface 24 outputs the trace ID (ARID2+0010b) to the read request of ARID2 to the trace circuit 15. It is assumed that responses to a plurality of read requests of the same ID are obtained in order.

The DMA controller 12 counts the number of responses every ID of a read request by using, for example, the request management buffer 25 and uses the count information as an addition ID. When the DMA controller 12 obtains the first response (read data) whose RID is ARID1 from the memory 14, the trace interface 24 outputs the trace ID (ARID1+0001b) as DmaTrcArID. When the DMA controller 12 obtains the second response whose RID is ARID1, the trace interface 24 outputs the trace ID (ARID1+0010b) as DmaTrcArID. when the DMA controller 12 obtains the response whose RID is ARID2, the trace interface 24 outputs the trace ID (ARID2+0010b) as DmaTrcArID.

Summary

In the embodiment, the trace interface 24 outputs the trace ID to the trace circuit 15. The trace circuit 15 stores, for example, a read request and a write request including the trace ID to the trace buffer 16. By using the trace ID, in the event of debugging, a request to a response output from the memory 14 can be identified from a plurality of read and write requests having the same ID. By using the trace ID, for example, also when the on/off of the trace function is dynamically switched or when a part of a response is dropped, a request and a response can be correctly associated at the time of debugging.

For example, when the outstand of the DMA is 1, by monitoring the bus 52, the trace circuit 15 can be easily configured without using the trace interface 24. However, considering the case where a read request is processed out of order, when responses passing through the bus 52 are buffered and whether data of an address as a breakpoint exists in them or not is collated, there is the possibility that the collation cannot catch up with the high operation speed of the bus 52. In the embodiment, since a trace ID is used, the corresponding relation between a request and a response can be easily determined, and the frequency is relatively low. There is consequently an effect that a circuit having margin also in timing can be generated.

Although the present invention achieved by the inventors herein has been concretely described above on the basis of the embodiments, obviously, the invention is not limited to the foregoing embodiments and can be variously changed without departing from the gist.

What is claimed is:

1. A semiconductor device comprising:
   a bus;
   a memory coupled to the bus;
   a DMA (Direct Memory Access) controller receiving a DMA request and accessing the memory via the bus on a predetermined access unit basis in accordance with the received DMA request;
   a trace circuit collecting trace data and storing it into a trace buffer; and
   a trace interface outputting information regarding the access to the memory via the bus by the DMA controller to the trace circuit,
   wherein when the DMA request indicates "read", the DMA controller outputs a read request to the memory via the bus and obtains data from the memory and, when the DMA request indicates "write", the DMA controller outputs a write request to the memory via the bus and writes data into the memory,
   wherein when the DMA request indicates "read", the trace interface outputs data obtained from the memory, a start address designated by the DMA request, and a valid transfer size in the data obtained from the memory to the trace circuit, and
   wherein the trace circuit stores, into the trace buffer, data of the amount of the valid transfer size from the start address designated by the DMA request in the data obtained from the memory.

2. The semiconductor device according to claim 1,
   wherein when the DMA request indicates "read", the DMA controller determines whether the start address designated by the DMA request matches a boundary address in the predetermined access unit or not and, when a mismatch is determined, the DMA controller outputs a read request including an address aligned to the boundary address as a read start address to the memory via the bus, and obtains data including data in a range designated by the DMA request from the memory, and
   wherein the trace interface outputs data size of the data in the range designated by the DMA request as the valid transfer size to the trace circuit.

3. The semiconductor device according to claim 2,
   wherein the DMA controller has a buffer buffering the read request and data obtained from the memory, and
   wherein when the start address designated by the DMA request does not match the boundary address in the predetermined access unit, the trace interface rewrites the read start address included in the buffered read request to the start address designated by the DMA request, and outputs the read request in which the read start address is rewritten and the buffered data to the trace circuit.

4. The semiconductor device according to claim 3, wherein the trace interface adds the valid transfer size to the read request and outputs the resultant to the trace circuit.

5. The semiconductor device according to claim 1, wherein the read request further includes burst size and burst length.

6. The semiconductor device according to claim 1,
   wherein when the DMA request indicates "write", the DMA controller outputs a strobe signal for designating data having data width corresponding to the predetermined access unit and data to be written in the data to the bus, outputs a write request including the write start address to the memory via the bus, and writes data to the start address designated by the DMA request in the memory, wherein the trace interface further outputs data designated as data to be written by the strobe signal in the data output to the memory, the start address designated by the DMA request, and valid transfer size in the data output to the bus to the trace circuit, and wherein the trace circuit further stores data output from the trace interface into the trace buffer.

7. The semiconductor device according to claim 6, wherein the DMA controller has a buffer buffering the write request and data output to the bus, and wherein the trace interface shifts data designated as data to be written in the buffered data to a most significant bit side or a least significant bit side and outputs the data shifted to the most significant bit side or the least significant bit side and the buffered write request to the trace circuit.

8. The semiconductor device according to claim 7, wherein the trace circuit stores data of the amount of the valid transfer size from the most significant bit side or the least significant bit side in the data shifted to the most significant bit side or the least significant bit side into the trace buffer.

9. The semiconductor device according to claim 6, wherein the trace interface adds the valid transfer size to the write request and outputs the resultant to the trace circuit.

10. The semiconductor device according to claim 6, wherein the write request further includes burst size and burst length.

11. The semiconductor device according to claim 4, wherein the DMA controller has a request management buffer managing a corresponding relation between the DMA request and the read request, and wherein when the DMA controller outputs the read request, referring to the request management buffer, the trace interface rewrites a read start address included in the buffered read request to a start address designated by the DMA request and obtains the valid transfer size from the request management buffer.

12. The semiconductor device according to claim 11, wherein the request management buffer stores a low-level address of the start address corresponding to the difference between the start address designated by the DMA request and the read start address included in the read request so as to be associated with the DMA request, and wherein the trace interface reads the low-order address from the request management buffer, and by adding the read low-order address to the read start address, the trace interface rewrites the read start address included in the buffered read request to the start address designated by the DMA request.

13. The semiconductor device according to claim 1, wherein the DMA controller performs management by assigning the trace identifier to each of a plurality of read and write requests, and wherein the trace interface further outputs the trace identifier to the trace circuit.

14. The semiconductor device according to claim 1, wherein the bus is a bus for performing communication according to an AXI (Advanced eXtensible Interface) bus protocol.

15. A trace data storing method comprising the steps of:

when a start address designated by a DMA (Direct Memory Access) request matches a boundary address in a predetermined access unit, outputting a read request including the start address as a read start address from a DMA controller accessing a memory coupled via a bus on the predetermined access unit basis in accordance with the DMA request to the memory and, when the start address designated by the DMA request does not match the boundary address in the predetermined access unit, outputting a read request including an address aligned to the boundary address as a read start address to the memory;

outputting, when the start address designated by the DMA request matches the boundary address in the predetermined access unit, data in a range designated by the DMA request from the memory to the DMA controller, and outputting, when the start address designated by the DMA request does not match the boundary address in the predetermined access unit, data including the data in the range designated by the DMA request and data out of the range from the memory to the DMA controller; and storing, when the start address designated by the DMA request matches the boundary address in the predetermined access unit, data output from the memory to the DMA controller into a trace buffer, and storing, when the start address designated by the DMA request does not match the boundary address in the predetermined access unit, data of the amount of a valid transfer size from the start address designated by the DMA request in the data output from the memory to the DMA controller into the trace buffer.

* * * * *